(12) United States Patent
Wu et al.

(10) Patent No.: US 8,703,291 B2
(45) Date of Patent: Apr. 22, 2014

(54) FUSER MEMBER

(75) Inventors: Jin Wu, Pittsford, NY (US); Edward F. Grabowski, Webster, NY (US); Lin Ma, Pittsford, NY (US); Lanhui Zhang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 254 days.

(21) Appl. No.: 13/069,540

(22) Filed: Mar. 23, 2011

(65) Prior Publication Data

US 2012/0244339 A1  Sep. 27, 2012

(51) Int. Cl.
- *B32B 5/16* (2006.01)
- *B32B 37/02* (2006.01)
- *B32B 27/00* (2006.01)

(52) U.S. Cl.
USPC ............ 428/407; 428/402; 428/403; 428/421

(58) Field of Classification Search
None
See application file for complete search history.

(56) References Cited

U.S. PATENT DOCUMENTS

| 4,479,997 | A | 10/1984 | Masterson et al. |
| 5,582,937 | A | 12/1996 | La Follette |
| 5,627,001 | A * | 5/1997 | Vail .......................... 430/111.32 |
| 5,795,500 | A | 8/1998 | Law et al. |
| 6,061,545 | A | 5/2000 | Cerrah |
| 6,625,416 | B1 * | 9/2003 | Badesha et al. ............... 399/308 |
| 6,830,710 | B2 | 12/2004 | Bonnet et al. |
| 2004/0091715 | A1 | 5/2004 | Pickering et al. |
| 2012/0244339 | A1 | 9/2012 | Wu et al. |
| 2012/0244464 | A1 | 9/2012 | Wu et al. |

OTHER PUBLICATIONS

Polymer Plastics Company, Kynar, retrieved Jan. 10, 2013, http://www.polymerplastics.com/insulation_kynar.shtml, p. 1.
English: U.S. Appl. No. 13/069,532, Office Action Jan. 16, 2013, 19pgs.
U.S. Appl. No. 13/069,530, Office Action dated May 15, 2013.

* cited by examiner

*Primary Examiner* — Sheeba Ahmed
(74) *Attorney, Agent, or Firm* — Hoffman Warnick LLC

(57) ABSTRACT

The present teachings provide a fuser member. The fuser member includes a substrate layer and a surface layer disposed on the substrate layer. The substrate layer comprises a plurality of core-shell particles wherein the core is a conductive particle and the shell is a fluoroplastic dispersed in a fluoroelastomer.

18 Claims, 4 Drawing Sheets

FUSER MEMBER

CROSS REFERENCE TO RELATED APPLICATIONS

This application relates to commonly assigned copending application Ser. No. 13/069,530 and Ser. No. 13/069,532, filed simultaneously herewith and incorporated by reference herein in their entirety.

BACKGROUND

1. Field of Use

This disclosure is generally directed to fuser members useful in electrophotographic imaging apparatuses, including digital, image on image, and the like. In addition, the fuser member described herein can also be used in a transfix apparatus in a solid ink jet printing machine.

2. Background

In the electrophotographic printing process, a toner image can be fixed or fused upon a support (e.g., a paper sheet) using a fuser roller. Conventional fusing technologies apply release agents/fuser oils to the fuser roller during the fusing operation, in order to maintain good release properties of the fuser roller.

New fusing topcoat materials are required with superior release and improved mechanical robustness. Current fluoroelastomer (VITON) topcoats need fuser oil for releasing. The releasing property of the fluoroelastomer topcoat needs to be further improved. Since toner is more similar to oil in nature, topcoats that are more oleophobic are desirable for better release.

Another critical parameter for fuser topcoats is electrical conductivity, and fluoroelastomers are not conductive. Small disruptions in toner positioning due to interactions with trapped electrostatic charges on fuser elements (fuser roll, pressure roll, etc.) can cause problems, especially in higher end machines. Eliminating these artifacts by dissipating any triboelectric generated charges is desirable. Thus, a conductive fuser topcoat is desirable.

SUMMARY

According to an embodiment, a fuser member is provided. The fuser member includes a substrate layer. The substrate layer comprises a plurality of core-shell particles wherein the core is a conductive particle and the shell is a fluoroplastic dispersed in a fluoroelastomer.

According to another embodiment, there is provided a fuser member comprising a substrate layer, a functional layer disposed on the substrate and a surface layer disposed on the functional layer. The surface layer comprises a plurality of core-shell particles wherein the core is a conductive particle and the shell is a fluoroplastic dispersed in a fluoroelastomer.

According to another embodiment there is provided a fuser member. The fuser member includes a substrate layer and a surface layer disposed on the substrate layer. The surface layer comprises a plurality of core-shell particles wherein the core is a bronze particle or a carbon particle and the shell is a polytetrafluoroethylene dispersed in a fluoroelastomer. The surface layer comprises a surface resistivity of from about $10^5$ ohms/square to about $10^{16}$ ohms/square.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
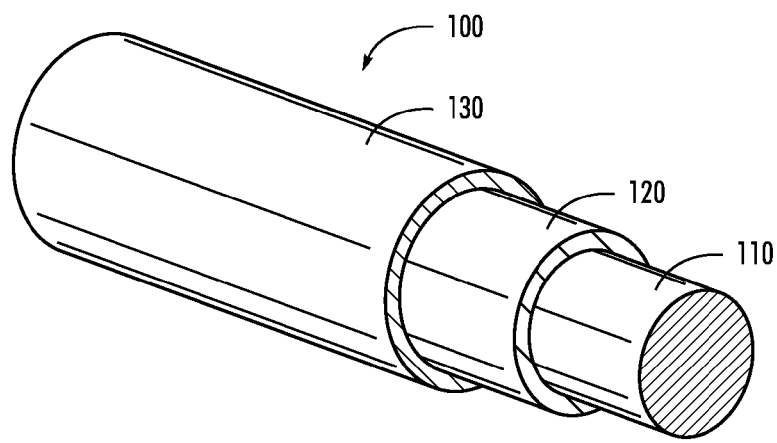
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The fixing member can include a substrate having one or more functional layers formed thereon. The substrate can include, e.g., a cylinder or a belt. The one or more functional layers include an outermost or surface layer. Such fixing member can be used in high speed, high quality electrophotographic printing to ensure and maintain a good toner release from the fused toner image on an image supporting material (e.g., a paper sheet), and further assist paper stripping.

In various embodiments, the fixing member can include, for example, a substrate, with one or more functional layers formed thereon. The substrate can be formed in various shapes, e.g., a cylinder (e.g., a cylinder tube), a cylindrical drum, a belt, a drelt (a cross between a drum and a belt), or a film, using suitable materials that are non-conductive or conductive depending on a specific configuration, for example, as shown in FIGS. 1 and 2.

Figure 2:
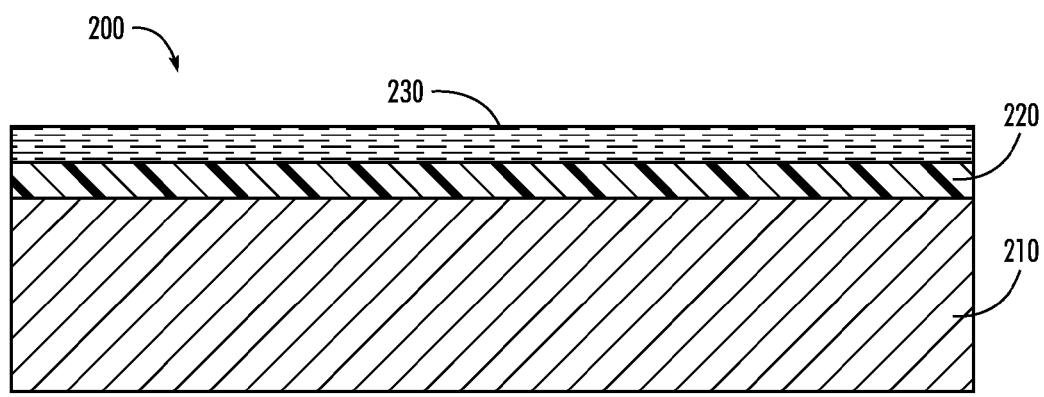
FIG. 2 depicts an exemplary fusing member having a belt substrate in accordance with the present teachings.

Specifically, FIG. 1 depicts an exemplary embodiment of a fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 and an outer layer 130 formed thereon. The outer layer 130 comprises a plurality of core-shell particles wherein the core is a conductive particle and the shell is a fluoroplastic, dispersed in a fluoroelastomer. The outer layer has a thickness of from about 2 microns to about 250 microns, or from about 10 microns to about 150 microns, or from about 15 microns to about 50 microns. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The outer surface 230 or release layer comprises a plurality of core-shell particles wherein the core is a conductive particle and the shell is a fluoroplastic, dispersed in a fluoroelastomer. The outer layer has a thickness of from about 2 microns to about 250 microns, or from about 10 microns to about 150 microns, or from about 15 microns to about 50 microns. The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes), or metals (e.g., aluminum, nickel or stainless steel) to maintain rigidity and structural integrity as known to one of ordinary skill in the art.

Examples of functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of functional layers 120 and 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF® NM® FOR-THF®, FOR-TFS® TH® NH®, P757 TNS®, T439®, PL958® BR9151® and TN505®, available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and a cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the functional layer can be from about 0.5 mm to about 10 mm, or from about 1 mm to about 8 mm, or from about 2 mm to about 7 mm. For a belt configuration, the thickness of the functional layer can be from about 25 microns up to about 2 mm, or from 40 microns to about 1.5 mm, or from 50 microns to about 1 mm.

Additives and additional conductive or non-conductive fillers may be present in the substrate 110, 210 or the functional layers 120, 130. In various embodiments, other filler materials or additives including, for example, inorganic particles, can be used for the coating composition and the subsequently formed surface layer. Conductive fillers used herein include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials. Fillers may be added from about 0 weight percent to about 10 weight percent, or from about 0 weight percent to about 5 weight percent, or from about 1 weight percent to about 3 weight percent of the total weight of the substrate 110, 210 or the functional layers 120 and 220.

Optionally, any known and available suitable adhesive layer may be positioned between the outer surface layer, the functional layer and the substrate. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 3A:
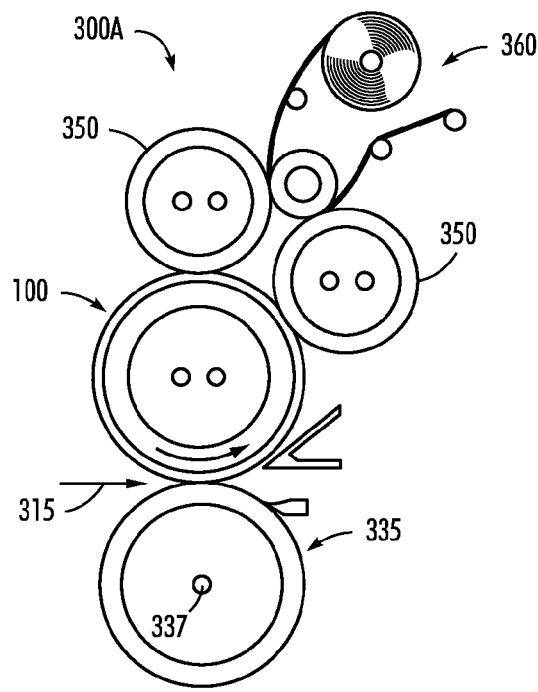
FIGS. 3A-3B depict exemplary fusing configurations using the fuser rollers shown in FIG. 1 in accordance with the present teachings.
Figure 3B:
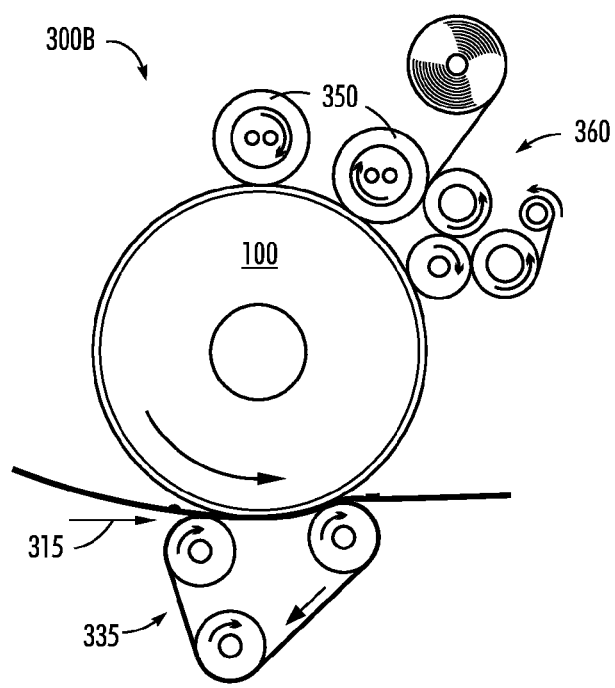
Figure 4A:
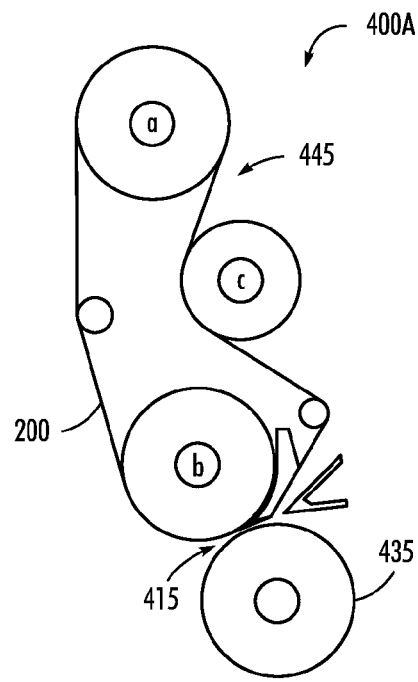
FIGS. 4A-4B depict another exemplary fusing configurations using the fuser belt shown in FIG. 2 in accordance with the present teachings.
Figure 4B:
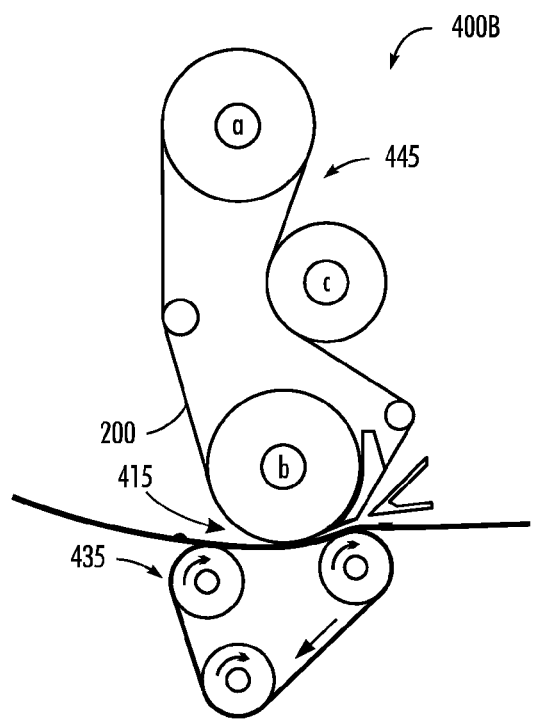

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fuse the toner particles and forming images on the media substrate 415. The mechanical system 445 can include one or more rollers 445a-c, which can also be used as heat rollers when needed.

Figure 5:
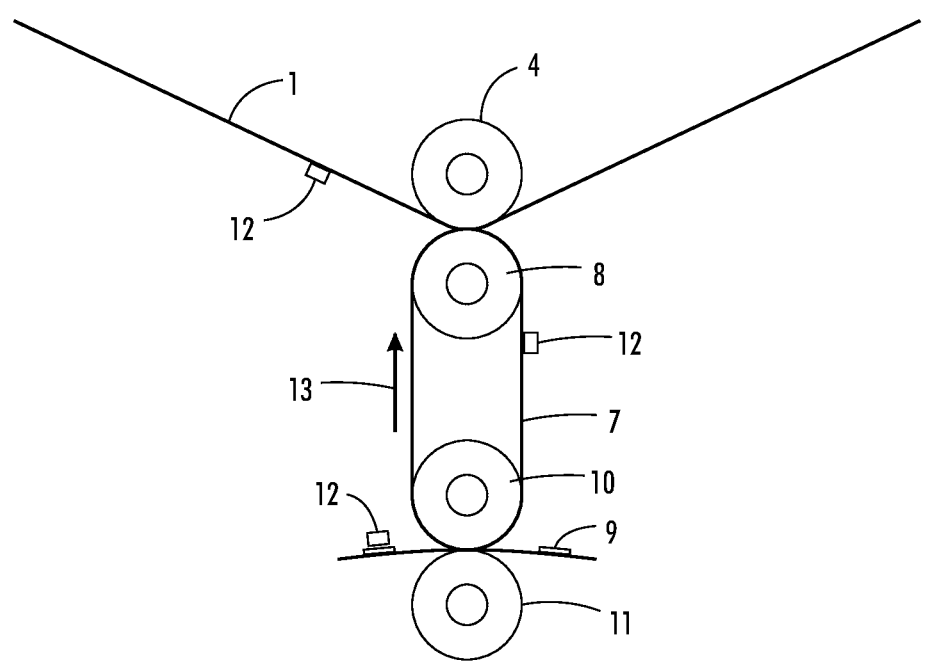
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Described herein is fuser topcoat comprising a fluoroelastomer matrix such as VITON having dispersed therein a conductive filler, which filler is core shell-particle of a conductive core having an fluoroplastic shell.

The surface layer 130 or 230 includes a fluoroelastomer matrix. The fluoroelastomers are from the class of 1) copolymers of two of vinylidenefluoride, hexafluoropropylene, and tetrafluoroethylene; such as those known commercially as VITON A® 2) terpolymers of vinylidenefluoride, hexafluoropropylene, and tetrafluoroethylene, those known commercially as VITON B®; and 3) tetrapolymers of vinylidenefluoride, hexafluoropropylene, tetrafluoroethylene, and a cure site monomer those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF® NM® FOR-THF®, FOR-TFS® TH® NH®, P757 TNS®, T439 PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

Core-Shell Particles

The core-shell particles comprise a conductive core. The core of the conductive particles is a material selected from the group consisting of carbon black, carbon nanotube, carbon fiber, graphene, graphite, metal such as copper, aluminum, gold, silver, iron nickel and bronze, and metal oxide such as tin oxide, zinc oxide and titanium oxide. The core size is from about 10 nanometers to about 1,000 nanometers, or from about 100 nanometers to about 800 nanometers, or from about 200 nanometers to about 600 nanometers.

The shell of the core shell particles comprises a fluoroplastic. Fluoroplastics include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymers include polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. Fluoroplastic shells provide chemical and thermal stability and have a low surface energy. The fluoroplastic shell is present in an amount of from about 1 weight percent to about 80 weight percent, or from about 5 weight percent to about 60 weight percent, or from about 10 weight percent to about 40 weight percent of the core shell particle.

One commercial example of the bronze PTFE core shell filler is AGLOFLON® 60BZ bronze PTFE core shell filler with a resistivity of $10^7$ ohm*cm; and one commercial example of the carbon PTFE core shell filler is AGLOFLON® 1.2CSC carbon PTFE core shell filler with a resistivity of $10^3$ ohm*cm, both obtained from Ausimont USA.

The topcoat layer 130 or 230 of the fuser member provides a layer that has a low surface energy. The topcoat layer exhibits a water contact angle of from about 100° to about 150°, or from about 105° to about 135°, or about 110° to about 130°. The hexadecane contact angle of the surface layer is from about 50° to about 90°, or from about 55° to about 85°, or about 60° to about 80°. As a comparison, a fluoroplastic, such as polytetrafluorethylene or a fluoroelastomer, such as VITON usually exhibit a water contact angle of about 110°, and a hexadecane contact angle of about 45°. In addition, the resistivity of the disclosed coating is about $10^5$ ohm/square to about $10^{16}$ ohm/square, or from about $10^{11}$ ohm/square to about $10^{15}$ ohm/square, or from $10^{12}$ ohm/square to about $10^{14}$ much less resistive than a VITON or PTFE coating without conductive particles.

The topcoat layer is prepared by dispersing the core-shell particles having the conductive core and the fluoroplastic shell, fluoroelastomer particles and a solvent. The solvent is selected from the group consisting of tetrahydrofuran, methyl ethyl ketone, methyl isobutyl ketone, N,N'-dimethylformamide, N,N'-dimethylacetamide, N-methylpyrrolidone and methylene chloride. In embodiments, the weight ratio of the fluoroelastomer particles to the core-shell particles in the coating composition is about 99/1 to about 50/50, or from about 95/5 to about 65/35, or from about 90/10 to about 80/20. In embodiments the coating composition of comprises a weight percent solids of from about 5 weight percent to about 50 weight percent, or from about 7 weight percent to about 45 weight percent or from about 10 weight percent to about 40 weight percent.

The coating mixture or solution is coated in any suitable known manner. Typical techniques for coating such materials on a substrate layer or intermediate layer include flow coating, liquid spray coating, dip coating, wire wound rod coating, fluidized bed coating, powder coating, electrostatic spraying, sonic spraying, blade coating, molding, laminating, and the like.

The topcoat coating mixture or solution is coated on the substrate layer or intermediate layer and cured. After the topcoat coating composition is coated, heat is applied to remove the solvent and cure the fluoroelastomers. The temperatures heating for solvent removal and curing is from about 120° C. to about 300° C., or from about 140° C. to about 270° C., or from about 150° C. to about 250° C. The time required for solvent removal varies with the temperature. In embodiments the time is from about 1 hour to about 8 hours or from about 2 hours to about 7 hours or from about 3 hours to about 6 hours.

EXAMPLES

Experimentally bronze PTFE core shell filler and carbon PTFE core shell particles were dispersed in a VITON® GF/curative/MIBK solution (about 15 weight percent solids) via Attritor milling. The resulting dispersions (VITON® GF/AGLOFLON® 60BZ or VITON® GF/AGLOFLON® 1.2CSC=80/20) were coated on a polyimide film via a draw bar coater, and subsequently cured at 75° C. for 20 minutes, 150° C. for 30 minutes and 235° C. for 90 minutes, and a 30 μm thick topcoat was obtained. The disclosed topcoat had excellent adhesion (did not peel) to the polyimide bottom layer.

The topcoat was further tested for contact angles and resistivity, and the results are shown in Table 1, and the data of VITON topcoat alone is also included for comparison.

TABLE 1

| | VITON/bronze PTFE core shell filler = 80/20 topcoat | VITON/carbon PTFE core shell filler = 80/20 topcoat | VITON |
|---|---|---|---|
| Water contact angle | ~110° | ~137° | ~110° |
| Hexadecane contact angle | ~60° | ~73° | ~45° |
| Resistivity (ohm/square) | $2.3 \times 10^{14}$ | $1.2 \times 10^{12}$ | ~$10^{16}$ |

When compared with the VITON topcoat, the disclosed topcoat was more oleophopbic (higher hexadecane contact angle), which was critical for toner transfer and cleaning since toner is mostly oil in nature. Furthermore, when compared with the bronze PTFE core shell filler/VITON topcoat, the carbon PTFE core shell filler/VITON topcoat was more hydrophobic, more oleophobic and more conductive.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:
1. A fuser member comprising:
 a surface layer disposed on the substrate layer comprising a plurality of core-shell particles wherein the core is a conductive particle and the shell is a fluoroplastic, dispersed in a fluoroelastomer, wherein the conductive particle is selected from the group consisting of a bronze particle and a carbon particle and the fluoroplastic is polytetrafluoroethylene, and wherein the surface layer comprises a hexadecane contact angle of from about 50° to about 90°.

2. The fuser member of claim 1 wherein the conductive particle comprises a material selected from the group consisting of carbon, metal, and metal oxide.

3. The fuser member of claim 1 wherein the fluoroelastomer is selected from the group consisting of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

4. The fuser member of claim 1 wherein the fluoroplastic comprises a material selected from the group consisting of polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; tetrapolymers of tetrafluoroethylene, vinylidene fluoride, and hexafluoropropylene, and mixtures thereof.

5. The fuser member of claim 1 wherein the fluoroelastomer and the plurality of core-shell particles are present in a weight ratio of from about 99 to 1 to about 50 to 50.

6. The fuser member of claim 1 wherein the surface layer comprises a water contact angle of from about 100° to about 150°.

7. The fuser member of claim 1 wherein the surface layer comprises surface resistivity of from about $10^5$ ohms/square to about $10^{16}$ ohms/square.

8. The fuser member of claim 1 wherein the surface layer has a thickness of from about 2 microns to about 250 microns.

9. A fuser member comprising:
a substrate;
a functional layer disposed on the substrate; and
an outer layer disposed on the functional layer comprising a plurality of core-shell particles wherein the core is a conductive particle selected from the group consisting of a bronze particle and a carbon particle, and the shell comprises polytetrafluoroethylene, wherein the core-shell particles are dispersed in a fluoroelastomer, and wherein the surface layer comprises a hexadecane contact angle of from about 50° to about 90°.

10. The fuser member of claim 9 wherein the substrate layer comprises a material selected from the group consisting of polyimides, polyarimides, poly ether ketones, polyetherimides, polyamideimides, polyphthalimides, polyketones, polyphenylene sulfides, fluoropolyimides, fluoropolyurethanes, aluminum, nickel and stainless steel.

11. The fuser member of claim 9 comprising a roller.

12. The fuser member of claim 9 comprising a belt.

13. The fuser member of claim 9 wherein the surface layer comprises a water contact angle of from about 100° to about 150°.

14. The fuser member of claim 9 wherein the surface layer comprises surface resistivity of from about $10^5$ ohms/square to about $10^{16}$ ohms/square.

15. The fuser member of claim 9 wherein the resilient layer is selected from the group consisting of silicone and fluoroelastomer.

16. A fuser member comprising:
a substrate layer; and
a surface layer disposed on the substrate layer comprising a plurality of core-shell particles wherein the core is selected from the group consisting of a bronze particle and a carbon particle and the shell is a polytetrafluoroethylene, wherein the plurality of core-shell particles are dispersed in a fluoroelastomer wherein the surface layer comprises a surface resistivity of from about $10^5$ ohms/square to about $10^{16}$ ohms/square, and wherein the surface layer comprises a hexadecane contact angle of from about 50° to about 90°.

17. The fuser member of claim 16 wherein the fluoroelastomer is selected from the group consisting of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

18. The fuser member of claim 16 wherein the surface layer has a thickness of from about 2 microns to about 250 microns.

* * * * *